US005756562A

United States Patent [19]

Lucarelli et al.

[11] Patent Number: 5,756,562

[45] Date of Patent: May 26, 1998

[54] SOLID SILICONE ADDITIVE SYSTEMS

[75] Inventors: Michael Anthony Lucarelli, Clifton Park; William John Raleigh, Rensselaer, both of N.Y.

[73] Assignee: General Electric Company, Waterford, N.Y.

[21] Appl. No.: 701,211

[22] Filed: Aug. 21, 1996

Related U.S. Application Data

[63] Continuation of Ser. No. 263,159, Jun. 20, 1994, abandoned, which is a continuation of Ser. No. 875,958, Apr. 29, 1992, abandoned.

[51] Int. Cl.$^6$ .................................................. C09K 21/14
[52] U.S. Cl. .................. 523/179; 524/506; 524/588; 524/730; 524/858; 524/863; 525/100; 525/106; 525/393; 525/431; 525/446; 525/464
[58] Field of Search .................. 523/179; 524/858, 524/863, 730, 506, 588; 525/100, 106, 393, 431, 446, 464

[56] References Cited

U.S. PATENT DOCUMENTS

| | | | |
|---|---|---|---|
| 4,100,129 | 7/1978 | Beers | 260/375 B |
| 4,287,109 | 9/1981 | Schlak et al. | 260/29.2 M |
| 4,434,283 | 2/1984 | Sattlegger et al. | 528/34 |
| 4,461,867 | 7/1984 | Surprenant | 524/788 |
| 4,528,353 | 7/1985 | Lucas et al. | 528/21 |
| 4,683,271 | 7/1987 | Lin et al. | 525/403 |
| 4,929,669 | 5/1990 | Jensen | 524/861 |
| 5,008,154 | 4/1991 | Meddaugh | 428/447 |

*Primary Examiner*—Karen A. Dean
*Attorney, Agent, or Firm*—Kenneth S. Wheelock

[57] ABSTRACT

A novel silicone system comprising a methoxy terminated silane or polysiloxane, an adhesion promoter and water, useful as a filler alone or in combination with other fillers is disclosed.

9 Claims, No Drawings

SOLID SILICONE ADDITIVE SYSTEMS

This is a continuation of Ser. No. 08/263,159 filed on Jun. 20, 1994, now abandoned, which is continuation of Ser. No. 07/875,958 filed on Apr. 29, 1992, also now abandoned.

The present invention relates to a novel silicone additive system which is in the form of a solid or a cream. More particularly the present invention relates to adding the novel silicone additive compositions to a variety of thermoplastics and fillers.

BACKGROUND OF THE PRESENT INVENTION

It has long been known that the addition of silicone compositions to fillers and thermoplastics provides useful blends with many important physical and chemical properties. However, the silicone compositions are invariably added to the thermoplastics and/or fillers in the form of a liquid, thus forming a paste-like composition. Such a paste-like composition is difficult to handle with modern processing equipment, which is more suitable for handling totally solid systems. It would therefore represent a notable advance in the state of the art if a silicone additive composition could be developed which is a solid or forms a solid when added to fillers, and is therefore easy to add to thermoplastic resins and/or fillers and which imparts on these combinations excellent physical and chemical properties.

There have been prior art disclosures of modifying silanes with alkoxy functional groups. See, for example, Sattlegger et al., U.S. Pat. No. 4,434,283, which discloses a molding composition comprising an α, ω- dihydroxyorganopolysiloxane with a viscosity of about 500 to 2,000,000 cP, a crosslinking agent, a reinforcing filler and 0.1 to 10 percent by weight of a silicon compound containing at least three alkoxy groups, which crosslinks in the presence of water.

It is also known in the art to add adhesive promoters to self-bonding alkoxy-functional one-component RTV compositions. See, for example, Lucas et al., U.S. Pat. No. 4,483,973; and Surprenant, U.S. Pat. No. 4,461,867.

However, none of the prior art references teach or suggest the preparation of a silicone composition which is a solid or forms a solid when added to a filler, and are therefore uniquely useful as an additive for thermoplastic resins.

SUMMARY OF THE PRESENT INVENTION

It has now been found that by reacting an alkoxy-modified silane or polysiloxane with water in the presence of an adhesion promoter provides a novel solid silicone composition which is easy to handle and which provides excellent physical and chemical properties when added to thermoplastics and fillers.

Accordingly, the present invention provides a novel silicone composition derived from:

(a) an alkoxy modified silane or polysiloxane;

(b) water; and (c) an adhesion promoter.

According to the present invention there is also provided a novel method for producing a silicone composition comprising reacting an alkoxy modified silane or polysiloxane and water in the presence of an adhesion promoter.

Also according to the present invention there is provided novel solid fillers comprising (A) a silicone composition comprising (a) a methoxy modified silane or polysiloxane, (b) water and (c) an adhesion promoter and (B) a filler.

Further according to the present invention there is provided a novel thermoplastic resin composition comprising (i) a thermoplastic resin and (ii) (A) a silicone composition comprising (a) a methoxy modified silane or polysiloxane, (b) water and (c) an adhesion promoter and optionally (B) a filler. Said silicone composition forms a solid upon standing.

DETAILED DESCRIPTION OF THE INVENTION

The present invention provides novel silicone compositions which can be added directly to thermoplastic resins or can be added to fillers to form novel filler additives, which can in turn be added to thermoplastic resins.

Component (a) of the novel silicone additive systems of the present invention comprise alkoxy-modified silanes or polysiloxanes. The alkoxy-modified silanes within the scope of the present invention are those of the general formula

$R_3SiO_{1/2}$ wherein each R is individually hydrogen, halogen or an organofunctional group such as alkyl, alkoxy or amino, provided at least one of the R groups represents an alkoxy group such as methoxy, ethoxy or propoxy. Most preferred is where at least one of the R groups is methoxy.

The alkoxy-modified polysiloxanes of the present invention can be represented by the formula $M'D_xM'$ wherein $M'$ represents a trifunctional siloxy group wherein the functionality is alkyl, vinyl, phenol, hydrogen, hydroxyl or epoxy, provided at least one of the functional groups in an $M'$ unit is alkoxy, and D represents a $R_2SiO_{2/2}$ unit wherein R is hydrogen, halogen, alkyl, alkoxy, amino or aminoalkyl. Preferably, the alkoxy end group of $M'$ is a methoxy. Illustratively, the polysiloxane can be a compound such as methoxy end stopped dimethyl polysiloxane, a compound such as methoxy terminated aminoethylaminopropyl polysiloxane, or a compound such as aminopropyltrimethoxysilane.

The alkoxy-modified silanes and polysiloxanes of the present invention can be a mixture of any of the contemplated silanes or polysiloxanes. Thus, a particularly useful alkoxy-modified component is a 75/25 weight ratio mixture of a methoxy end stopped dimethyl polysiloxane and methoxy terminated aminoethylaminopropyl polysiloxane.

These alkoxy-modified silanes and polysiloxanes can be prepared in accordance with procedures known to those of ordinary skill in the art, or are available commercially.

Preferably, the composition of the present invention comprise the alkoxy-modified silanes or polysiloxanes in amounts ranging from about 15 to about 75 weight percent based on the total weight of the silicone composition. Most preferred are amounts ranging from about 40 to about 60 weight percent.

Component (b) of the present invention is water. The water can be distilled or undistilled, and is generally present in amount ranging from about 10 to about 75 weight percent of the total weight of the silicone composition. In preferred embodiments, substantially equivalent amounts of water and methoxy modified silane or polysiloxane are employed in the compositions of the present invention.

Component (c) of the present invention comprises an adhesion promoter. These are known to those skilled in the art and are widely described in the patent literature.

Suitable adhesion promoters for use in the present invention are generally of the formula:

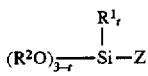

wherein $R^1$ and R are $C_{1-8}$ monovalent hydrocarbon radicals, t varies from 0 to 3 and Z is a saturated, unsaturated or aromatic hydrocarbon residue which may be further functionalized by a member selected from the group consisting of amino, ether, epoxy, isocyanato, cyano, acryloxy and acyloxy and combinations thereof.

In a preferred embodiment, the adhesion promoter is isocyanato functionalized and has the general formula:

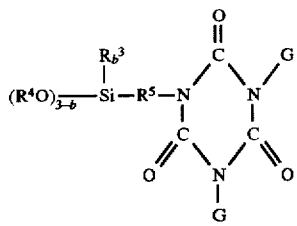

where G is selected from $R^3$ or

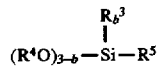

radicals, styryl, vinyl, allyl, chloroallyl, or cyclohexenyl, $R^3$ and $R^4$ are selected from $C_{1-8}$ monovalent hydrocarbon radicals or cyanoalkyl, $R^5$ is a $C_{2-12}$ divalent hydrocarbon radical selected from alkylenearylene, alkylene, cycloalkylene and halo-substituted divalent hydrocarbon radicals and b varies from 0 to 3.

For more information as to such compounds, one is referred to the disclosures of Beers, U.S. Pat. No. 4,100,129 and Berger, U.S. Pat. No. 3,821,218.

Suitable adhesion promoters include, but are not limited to 1,3,5-tristrimethoxysilylpropyl isocyanurate and bis-1,3-trimethoxysilylpropyliso- cyanurate. Other specific compounds are 1,3,5-tris- methoxysilylpropylisocyanurate; 1,3,5-tristri- methoxysilylethylisocyanurate; 1,3,5-trismethyl-dimethoxysilylpropylisocyanurate and 1,3,5-tris- methyldiethoxysilylpropylisocyanurate.

Other adhesion promoters useful in the practice of the present invention are: 3-(2-aminoethylamino)-propyltrimethoxysilane, gamma-aminopropyltriethoxysilane, gamma-aminopropyltrimethoxysilane, gamma-glycidoxypropyltrimethoxysilane, gamma-glycidoxypropyl-methyldimethoxysilane, beta-glycidoxyethyltrimethoxysilane, beta-(3,4-epoxycyclohexyl)ethyltrimethoxysilane, vinyltrimethoxysilane, gamma-cyanopropyltrimethoxysilane, gamma-methacryloxypropyltrimethoxysilane and the like.

The adhesion promoters are added to the silicone compositions of the present invention in amounts ranging from about 10 to about 75 weight percent based on the total weight of the silicone compositions. Preferred are amounts ranging from about 40 to about 60.

It is further contemplated that in addition to the alkoxy-modified silane or polysiloxane, water and adhesion promoter, other silicone components (d) may be added to the compositions of the present invention.

Particularly useful as component (d) are silanol chain-stopped polydiorganosiloxane, such as those of the general formula:

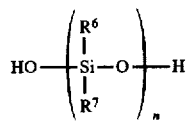

wherein $R^6$ and $R^7$ are each organic radicals of up to about 20, and preferably up to about 8, carbon atoms, selected from hydrocarbyl, halohydrocarbyl and cyano lower alkyl and n is a number that varies generally from about 20 to about 15,000, preferably from 100 to 3,000 and more preferably from 300 to 1,500.

The silanol chain-stopped polydiorganosiloxanes are well known in the art and they may be prepared by known methods, such as described in Beers, U.S. Pat. No. 3,382,205 and include compositions containing different $R^6$ and $R^7$ groups. For example, the $R^6$ groups can be methyl, while the $R^7$ groups can be phenyl and/or beta- cyanoethyl and/or trifluoropropyl. Furthermore, with the scope of the definition of silanol chain stopped polydiorganosiloxanes useful in this invention are copolymers of various types of diorganosiloxane units, such as silanol chain-stopped copolymers of dimethylsiloxane units, diphenylsiloxane units and methylphenyl siloxane units, or, for example, copolymers of dimethylsiloxane units, methylphenyl-siloxane units and methylvinyl siloxane units. Preferably, at least 50% of the $R^6$ and $R^7$ groups of the silanol chain-stopped polydiorganosiloxanes are alkyl, e.g. methyl groups.

Further, it is contemplated that a mixture of various silanol chain-stopped polydiorganosiloxanes may also be employed as the silanol chain stopped polydiorganosildxane component (d).

The silanol chain-stopped polydiorganosiloxanes employed in the practice of the present invention may vary from low viscosity thin fluids to viscous gums, depending on the value of n and the nature of the particular organic groups represented by $R^6$ and $R^7$.

The viscosity of the silanol chain stopped polydiorganosiloxane can therefore vary within a broad range, e.g. from about 20 to about 1,000,000 cps at 25° C. Preferably, it will be in the range of from about 1,000 to about 200,000 cps, and especially preferably from about 2,000 to about 60,000 cps at 25° C.

It is further contemplated that component (d) may comprise one or more other silicone fluids. These are well known to those of ordinary skill in the art.

Illustratively they may include those of the general formula

$MD_xM'$ where M represents a trialkylsiloxy group, D represents a dialkylsiloxy group, M' represents a trifunctional siloxy group wherein the functionality is alkyl, vinyl, phenol or epoxy and x is an integer greater than 1.

The silicones of the present invention are conveniently prepared by mixing together components (a), (b) and (c), and optionally (d), and allowing them to stand at room temperature until they solidify or become a creamy liquid. It is also contemplated that the mixtures may be heated to accelerate the reaction.

Alternatively, a filler may also be added to the reaction mixture. These fillers include both reinforcing and extending, inorganic and organic fillers. Typically they may be added in amounts ranging from about 1 to about 99 weight percent based on the total weight of filler and solid silicone. Preferably they are added in amounts ranging from about 50 to about 99 weight percent.

The fillers useful in the practice of the present invention are well known to persons of skill in the art. Typically they may comprise, for example, barium sulfate, titanium dioxide, zirconium silicate, silica aerogel, iron oxide, diatomaceous earth, fumed silica, carbon black, precipitated silica, glass fibers, polyvinyl chloride, ground quartz, calcium carbonate, zeolites, talc, mica, powdered plastics, chalk, mixtures thereof and the like. The amounts of filler can obviously be varied with wide limits in accordance with the intended use.

It is further contemplated by the present invention that the filler may also be treated with various agents. Exemplary treatments include cyclopolysiloxanes, such as those disclosed in Lucas, U.S. Pat. No. 2,938,009; and silazanes, such as those disclosed in Smith, U.S. Pat. No. 3,635,743, or both. The cyclopolysiloxane present may be, for example, a cyclotetramethylsiloxane present in an amount of from about 15 to about 20 weight percent of the filler.

In other embodiments of the present invention, it is contemplated that the silicone additive compositions can be prepared and then mixed directly with the fillers.

It is further contemplated by the present invention to add the solid filler/silicone additive system to a wide variety of thermoplastic resins, including but not limited to polyesters, polycarbonates, polyetherimides, polyetheresters, polyetherimide esters, polyolefins, polyphenylene ethers, polystyrene, mixtures thereof and the like. These thermoplastics are well known to those of ordinary skill in the art, are widely described in the patent literature and are available commercially. See, e.g., U.S. Pat. Nos. 2,465,319; 2,901,466; 3,047, 539; 3,306,874 and 3,306,875; 3,023,192; 4,556,688; 4,556, 705 and 3,161,615.

A particularly suitable combination is from about 30 to about 99 parts by weight of an additive system comprising from about 80 to 99 weight percent barium sulfate, and from about 1 to about 70 parts by weight of a polyester, such as poly(1,4-butylene terephthalate).

It is also contemplated that the silicone compositions of the present invention can be added directly to the thermoplastic resin without the use of the filler. Thus, for example, about 10–30 parts by weight of a solid silicone composition can be conveniently added directly to a about 70–90 parts by weight of a thermoplastic resin such as a poly(bisphenol A)carbonate.

From about 5 to about 20 parts by weight of the silicone compositions of the present invention provide improved properties when added to heavily filled thermoplastics.

DESCRIPTION OF THE PREFERRED EMBODIMENTS

The following examples illustrate the present invention. They are not to be construed to limit the scope of the appended claims in any manner whatsoever.

EXAMPLE 1

A base polymer was prepared by admixing 64.7 g of a 25/75 mixture of methoxy terminated aminoethylaminopropyl polysiloxane and methoxy terminated methyl siloxane resin, 46.5 g of 1,3,5-tris(trimethoxysilylpropyl) isocyanurate and 62.4 g of water at room temperature until a creamy, apricot colored, homogeneous liquid was produced. Within ten minutes, the liquid starts to become more viscous. The material is allowed to stand overnight, whereby it solidified. The solid material was collected, ground and allowed to air dry. 120.5 g of final solid ground product was collected.

EXAMPLE 2

To 60 g of the base polymer prepared according the procedure of Example 1 is added 40 g of polydimethyl silanol. Upon standing the mixture solidified to form a rubbery solid.

EXAMPLE 3

31.5 g of 1,3,5-tris(trimethoxysilylpropyl)-isocyanurate, 29.5 g of a 25/75 mixture of methoxy terminated aminoethylaminopropyl polysiloxane and methoxy terminated methyl siloxane resin, 30 g of water and 58.9 g of a mixture of approximately 66% MQ resin and 34% silanol stopped dimethyl polysiloxane having a viscosity of between 200, 000 and 900,000 cps are admixed at room temperature. Upon standing the mixture became a rubber.

EXAMPLE 4

300 g of the base polymer prepared according to the procedure of Example 1 is admixed with 200 g of Viscasil® 10 M, a trimethylsiloxy terminated polydimethyl siloxane. Upon standing the mixture solidified to a wax.

EXAMPLE 5

75 g of the base polymer prepared according to the procedure of Example 1 is admixed with 50 g of dimethyl polysiloxane. Upon standing, a waxy solid was formed.

EXAMPLE 6

90 g of the base polymer prepared according to the procedure of Example 1 is admixed with 30 g of dimethyl polysiloxane. Upon standing, a waxy solid was formed.

EXAMPLE 7

150 g of the base polymer prepared according to the procedure of Example 1 is admixed with 50 g of a dimethyl, methyl-2-(7-oxabicyclo(4.1.0)hept-3-yl) ethyl siloxane. Upon standing, a solid was formed.

EXAMPLE 8

80 g of dimethyl polysiloxane, 40.2 g of 1,3,5-tris (trimethoxysilylpropyl)isocyanurate, 80.4 g of a 25/75 mixture of methoxy terminated aminoethylaminopropyl polysiloxane and methoxy terminated methyl siloxane resin, and 40.2 g of water are mixed. Upon standing, the material did not solidify, but formed a viscous, stable cream.

EXAMPLE 9

6.5 g of 1,3,5-tris(trimethoxysilylpropyl)-isocyanurate, 6.5 g of a 25/75 mixture of methoxy terminated aminoethylaminopropyl polysiloxane and methoxy terminated methyl siloxane resin and 65 g of barium sulfate are mixed together to form a paste. To the paste is added 6.5 g of water. Mixing the water into the paste to form a homogeneous consistency was difficult. Upon standing, 79 g of solid was formed having 76.9 weight percent of barium sulfate.

EXAMPLE 10

106.8 g of barium sulfate was added to the base polymer prepared according to the procedure of Example 1. The mixture was stirred until a paste formed. Upon standing, the paste solidified to form 138.3 g of solid having 73 weight percent of barium sulfate.

EXAMPLE 11

510 g of a 25/75 mixture of methoxy terminated aminoethylaminopropyl polysiloxane and methoxy terminated methyl siloxane resin was mixed into 4585.4 g of barium sulfate to form a putty which appeared to solidify. Upon standing for a ten day period, the silicone fluid leached out of the product.

EXAMPLE 12

1.5 g of a 25/75 mixture of methoxy terminated aminoethylaminopropyl polysiloxane and methoxy terminated methyl siloxane resin was admixed with 26.5 g of barium sulfate. The mixture remained a solid. The material was heated at 140° C. in an oven for 3 hours. No change was noted.

EXAMPLE 13

10 g of a 25/75 mixture of methoxy terminated aminoethylaminopropyl polysiloxane and methoxy terminated methyl siloxane resin, 9.7 g of 1,3,5-tris(trimethoxysilylpropyl)isocyanurate, 10.3 g of water and 20.4 g of polydimethyl silanol are mixed. 33.5 g of this mixture was then added to 131.4 g of barium sulfate. Upon standing, the material solidified and 155.8 g of product was collected having 80 weight percent barium sulfate.

EXAMPLE 14

31.7 g of the liquid mixture from Example 3 is added to 104.9 g of barium sulfate and mixed by hand to the consistency of bread dough. The material solidified upon standing, and 125.4 g of product was collected having 76.8 weight percent barium sulfate.

EXAMPLE 15

394.5 g of the liquid mixture from Example 4 is admixed with 394.5 g of sodium sulfate. Upon standing, the material solidified to a wax-like consistency, which is 50 weight percent sodium sulfate.

EXAMPLE 16

114.9 g of the base polymer prepared according to the procedure of Example 1 is mixed with 460 g of titanium dioxide. Upon standing, the mixture solidified resulting in a product which is 80 weight percent titanium dioxide.

EXAMPLE 17

400.3 g of titanium dioxide is added incrementally to 400.7 g of the base polymer prepared in accordance with the procedure of Example 1. Upon standing the mixture solidified, giving a product which is 50 weight percent titanium dioxide.

EXAMPLE 18

125 g of the liquid mixture of Example 2 is mixed with 500 g of titanium dioxide which gives a solid upon standing. The product is 80 weight percent titanium dioxide.

EXAMPLE 19

125 g of the liquid mixture of Example 2 is mixed with 125 g of titanium dioxide which forms a solid upon standing. The product is 50 weight percent titanium dioxide.

EXAMPLE 20

7.3 g of the liquid mixture from Example 8 is mixed with 68 g of titanium dioxide. The mixture forms a solid upon standing, having 90 weight percent titanium dioxide.

EXAMPLE 21

109 g of the base polymer prepared in accordance with the procedure of Example 1 is mixed with 434.5 g of zeolite. Upon standing, a solid was formed having 80 weight percent zeolite.

EXAMPLE 22

170 g of the liquid mixture of Example 7 is admixed with 360.7 g of zeolite to form a solid upon standing. The solid product is 68 weight percent zeolite.

EXAMPLE 23

712 g of the base polymer prepared according to the procedures of Example 1 is mixed with Minex®, a commercially available silicate filler, and was allowed to solidify upon standing. The solid is 90 weight percent filler.

EXAMPLE 24

742 g of the liquid mixture from Example 7 is admixed with 6680 g of Minex®. Upon standing, the mixture solidifies, forming a solid which is 90 weight percent filler.

EXAMPLE 25

900 g of the base polymer prepared according to the procedures of Example 1 is admixed with 600 g of a dimethyl, methyl-2-(7-oxabicyclo(4.1.0)hept-3-yl)ethyl siloxane. 1159 g of this mixture is then added to 4634 g of barium sulfate, which solidifies upon standing. The solid product is 80 weight percent barium sulfate.

EXAMPLE 26

750 g of the base polymer prepared in accordance with the procedures of Example 1 is admixed with 500 g of dimethyl, methyl-2-(7-oxabicyclo(4.1.0.)hept-3-yl)ethyl siloxane. 100 g of this mixture were admixed with 4000 g of barium sulfate. Upon standing a solid product is formed which is 80 weight percent barium sulfate.

EXAMPLE 27

723 g of the base polymer prepared in accordance with the procedures of Example 1 is admixed with 6505 g of calcium carbonate. A solid product forms upon standing, having 90 weight percent calcium carbonate.

EXAMPLE 28

772 g of the liquid mixture from Example 7 is admixed with 6940 g of calcium carbonate, which forms a solid product after standing. The solid is 90 weight percent calcium carbonate.

EXAMPLES 29–33

Additional silicone compositions were prepared according to the general procedures of Examples 1–8, according to Table A below. All composition data is in parts by weight.

| Example | 29 | 30 | 31 | 32 | 33 |
| --- | --- | --- | --- | --- | --- |
| Methoxy siloxane[a] | 100.3 | 120.0 | 100.1 | 100.3 | 100.2 |
| Adhesion Promoter[b] | 100.5 | 12.0 | 10.0 | 100.2 | 45.1 |

9
-continued

| Example | 29 | 30 | 31 | 32 | 33 |
|---|---|---|---|---|---|
| Water | 19.4 | 14.4 | 12.0 | 19.0 | 12.0 |
| Polydimethyl silanol | 0.0 | 0.0 | 100.4 | 100.3 | 0.0 |
| Comments | Thickened within 1 hour; solid | Remained as a pasty liquid | Liquid | Rubbery, tacky | Solid waxy |

= SF 1706, General Electric Company, 25/75 mixture of methoxy terminated aminoethylaminopropyl polysiloxane and methoxy terminated methyl siloxane resin
= 1,3,5-tris(trimethoxysilylpropyl)isocyanurate The above-referenced patents are all hereby incorporated by reference.

Many variations of the present invention will suggest themselves to those skilled in this art in light of the above detailed description. For example, instead of employing a silanol fluid as the additional silicone fluid (d), a vinyl, phenyl or epoxy functional silicone fluid can be employed. Further, organic fillers can be employed in the same manner as the inorganic fillers without departing from the scope of the present invention. All such obvious modifications are within the full intended scope of the appended claims.

We claim:

1. A solid silicone composition comprising the reaction product of (a) from about 15 to about 75 weight percent based on the total weight of the silicone composition of an alkoxy modified silane or a polysiloxane having the formula:

$$M'D_xM'$$

where D has the formula:

$$R_2SiO_{2/2}$$

where each R is individually selected from the group consisting of hydrogen, halogen, alkyl, alkoxy, amino and aminoalkyl and where M' has the formula:

$$R_3SiO_{1/2}$$

where each R of M' is independently selected from the group consisting of alkoxy, alkyl, phenol, hydroxyl, and epoxy provided at least one of the R groups is alkoxy, and x is an integer greater than 1;

(b) from about 10 to about 75 weight percent based on the total weight of the silicone composition of water; and (c) from about 10 to about 75 weight percent based on the total weight of the silicone composition of an adhesion promoter having the formula:

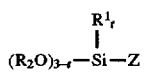

where $R^1$ and $R^2$ are one to eight carbon atom monovalent hydrocarbon radicals, t is a number ranging from zero to three and Z is selected from the group consisting of unsaturated, saturated or aromatic hydrocarbon and

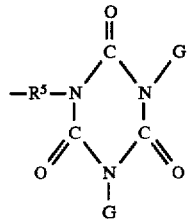

where $R^5$ is a two to twelve carbon atom divalent hydrocarbon radical selected from alkylenearylene, alkylene, cycloalkylene and halo-substituted divalent hydrocarbon and G is selected from the group consisting of styryl, vinyl, allyl, chloroallyl, cyclohexenyl, one to eight carbon atom monovalent hydrocarbon radicals, and

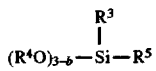

where $R^3$ is a one to eight carbon atom monovalent hydrocarbon radical, $R^4$ is a one to eight carbon atom monovalent hydrocarbon radical, $R^5$ is as previously defined and b is a number ranging from zero to three, whereby said silicone composition forms a solid upon standing.

2. The composition of claim 1 where the alkoxy group of M' is methoxy.

3. The composition of claim 2 where the R group of D is a methyl.

4. The composition of claim 3 where the adhesion promoter (c) is selected from the group consisting of 1,3,5-tristrimethoxysilylpropyl isocyanurate,
bis-1,3-trimethoxysilylpropylisocyanurate,
1,3,5-trismethoxysilylpropylisocyanurate,
1,3,5-tristrimethoxysilylethylisocyanurate,
1,3,5-trismethyldimethoxysilylpropylisocyanurate,
1,3,5-trismethyldiethoxysilylpropylisocyanurate,
3-(2-aminoethylamino)-propyltrimethoxysilane,
gamma-aminopropyltriethoxysilane,
gamma-glydicosypropyltrimethoxysilane,
gamma-glycidoxypropylmethyldimethoxysilane,
beta-glycidoxyethyltrimethoxysilane,
beta-(3,4-epoxycyclohexyl)ethyltrimethoxysilane,
vinyltrimethoxysilane,
gamma-cyanopropyltrimethoxysilane, and
gamma-methacryloxypropyltrimethoxysilane.

5. The composition of claim 1 additionally comprising a filler selected from the group consisting of barium sulfate, titanium dioxide, zirconium silicate, silica aerogel, iron oxide, diatomaceous earth, fumed silica, carbon black, precipitated silica, glass fibers, polyvinyl chloride, ground quartz, calcium carbonate, zeolites, talc, mica, powdered plastics, chalk and mixtures thereof.

6. A composition comprising (I) a liquid composition as defined in claim 1 and (II) a thermoplastic resin.

7. A thermoplastic resin composition comprising:

a) a thermoplastic resin and
b) the silicone composition of claim 1.

8. A thermoplastic resin composition comprising:
a) a thermoplastic resin and
b) the silicone composition of claim 5.

9. The thermoplastic resin composition of claim 8 wherein said thermoplastic resin is selected from the group consisting of polyesters, polycarbonates, polyetherimides, polyetheresters, polyetherimide esters, polyolefins, polyphenylene ethers, polystyrene and mixtures thereof.

* * * * *